United States Patent [19]
Butler et al.

[11] Patent Number: 5,528,927
[45] Date of Patent: Jun. 25, 1996

[54] CENTER OF GRAVITY LOCATOR

[75] Inventors: Joseph H. Butler, Memphis; Michael J. Twigg, Millington, Tenn.

[73] Assignee: Emhart Inc., Newark, Del.

[21] Appl. No.: 354,571

[22] Filed: Dec. 12, 1994

[51] Int. Cl.⁶ ........................................... A63B 53/00
[52] U.S. Cl. ........................................ 73/65.03; 73/65.01
[58] Field of Search .................... 73/65.01, 65.02, 73/65.03, 65.05, 65.06, 65.09; 177/190, 191, 192, 193, 255, 256, 246

[56] References Cited

U.S. PATENT DOCUMENTS

| | | |
|---|---|---|
| 2,062,673 | 12/1936 | Hogg et al. . |
| 2,108,877 | 2/1938 | Wettlaufer ............................ 73/65.03 |
| 2,307,877 | 1/1943 | Chapman ............................. 177/246 |
| 2,782,631 | 2/1957 | Baltrukonis et al. . |
| 3,064,469 | 11/1962 | Price ..................................... 73/65.01 |
| 3,210,989 | 10/1965 | Samborsky et al. . |
| 5,081,865 | 1/1992 | Schechter et al. . |
| 5,301,544 | 4/1994 | Smith . |
| 5,309,753 | 5/1994 | Johnson . |

Primary Examiner—Richard Chilcot
Assistant Examiner—Ronald Biegel
Attorney, Agent, or Firm—J. Bruce Hoofnagle

[57] ABSTRACT

A locator 20 for facilitating the location of the center of gravity of an object such as a golf club head 130 includes a balancing member 42 having a rod 88 extending in a first direction from the member and a threaded rod 100 extending from the member in a second direction opposite the first direction. An adjustable weight 94 is located on rod 88 and a holder 110 for supporting an adaptor 138 and club head 130 is located on a free end of rod 100. Adaptor 138 with club head 130 are positionable in at least three different positions on holder 110 representative of the "X", "Y" and "Z" coordinates of the center of gravity of the club head. When club head 130 is located in each of the three positions, balancing member becomes unbalanced. By adjustment of weight 94 on rod 88, balancing member becomes balanced. Various distance measurements are taken and, by use of a moment-summing equation, unknown distances are determined to locate the "X", "Y " and "Z" coordinates of the center of gravity of club head 130.

20 Claims, 8 Drawing Sheets

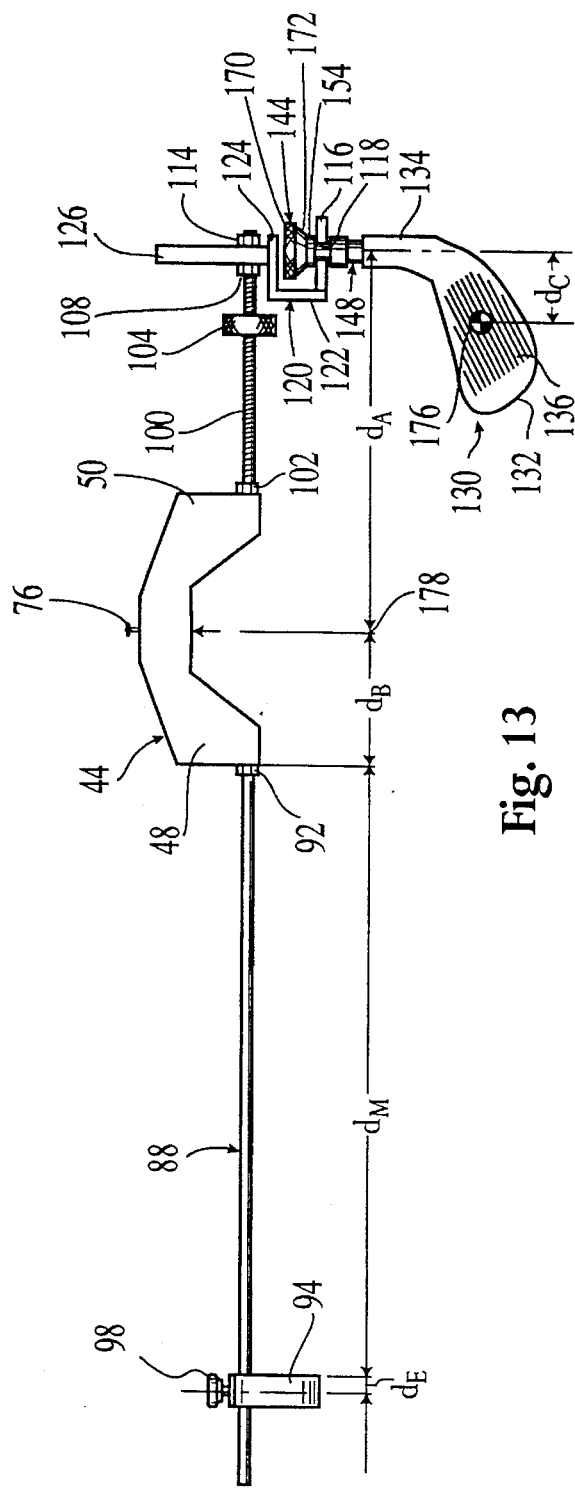
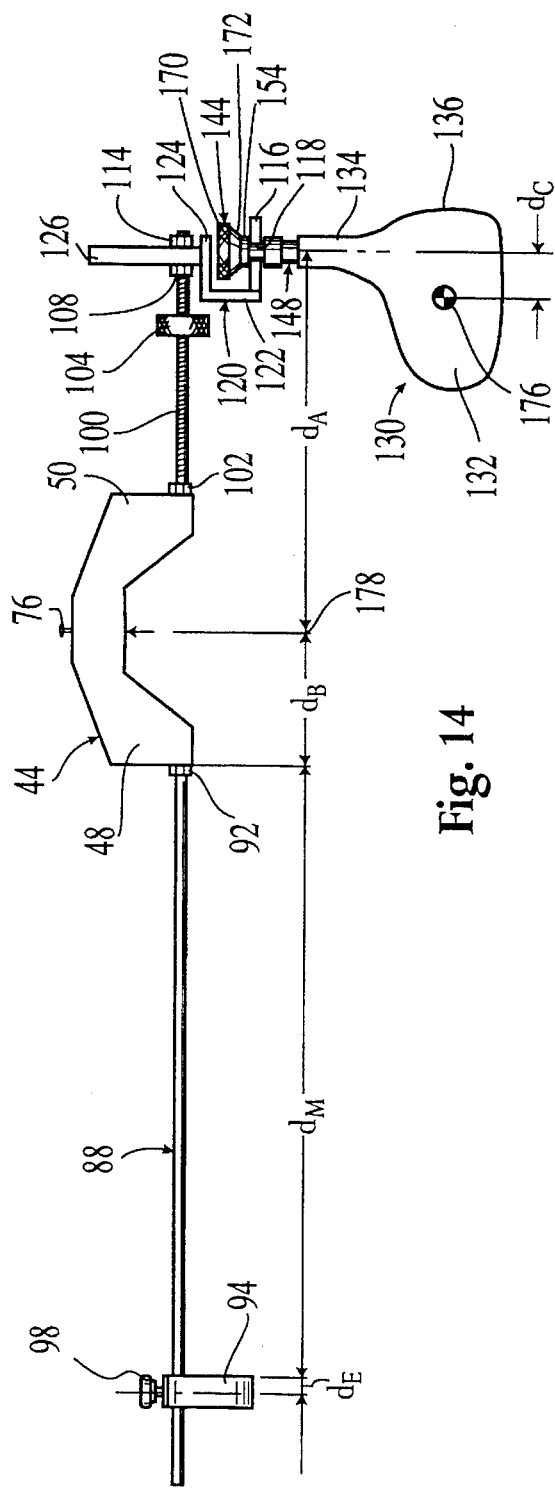
Fig. 13
Fig. 14

CENTER OF GRAVITY LOCATOR

BACKGROUND OF THE INVENTION

This invention relates to a center of gravity locator and relates particularly to a device for locating the center of gravity of objects such as, for example, golf club heads.

Various manufactured products are ultimately used in an environment where the products are subjected to movement such as, for example, a swinging movement. Sports activities which use various implements which are swung is an example of one category of such implements with golf clubs being a particular example within the sports category. When designing such implements, it is important to consider various momentum-related characteristics and parameters of the implements which ultimately have a bearing on the users efficient, and perhaps enjoyable, use of the implements.

Typically, in order to determine many of the momentum-related characteristics and parameters, it is necessary to first determine the center of gravity of one or more components of the implements where such information can then be used to determine the characteristics and parameters. For example, a golf club includes a slender, tapered, straight stick or shaft having a larger-diameter butt end and a smaller-diameter tip end with a club head attached to the tip end. When used, a golfer grips the butt end of the shaft and swings the club through an arc while aiming the club head in a direction to strike and drive a golf ball, hopefully, into a desired trajectory and distance. During the swinging motion of the club, the shaft tends to twist and bend as a result of the momentum and velocity of the head. Ultimately, the head strikes the ball with significant force which causes the head and the shaft to vibrate. It is preferable to keep the twisting, bending and vibration to a minimum. In order to minimize this twisting, bending and vibration reaction, serious effort must be directed to the initial design of the shaft and the head prior to manufacturing the golf club.

With respect to the head, various mathematical design considerations must be conducted to determine the optimum physical design for the head. Typically, the center of gravity of the head must be known before proceeding to conduct the mathematical design considerations.

Various techniques and facilities have been and are being used to determine the center of gravity of an object. For example, the object could be suspended from various wires, strings, cables or levers until an approximation of the center of gravity could be made. Such techniques frequently involve the use of load cells, strain gages, complicated mathematics and delicate measurement readings of angles and displacements to arrive at a reasonably accurate center of gravity measurement. In addition, the facilities are typically fragile and require close attention in handling and storage. Also, the integrity of the equipment used in such techniques tends quickly to decrease with constant use thereby requiring frequent replacement of components thereof.

A particular technique for determining the center of gravity of an object is disclosed in U.S. Pat. No. 2,782,631 wherein the object is placed on a previously levelled or balanced platform which is suspended from a base by a suspending means. The platform is shifted laterally relative to the base to re-balance the platform with the object placed thereon. By use of various scales and pointers, a reading can be obtained which represents one parameter associated with the location of the center of gravity of the object. The object can be adjusted to at least two other positions and readings obtained to provide additional parameters associated with the center of gravity of the object.

Another technique for locating the center of gravity of an object is disclosed in U.S. Pat. No. 3,210,989 wherein the object is placed on a tiltable platform which is supported on a two-point support. One point is provided with an appropriate weight indicator and the other point is provided with a standard on which the platform can be vertically adjusted. The platform is then located in a variety of horizontal and tilted positions and force measurements are taken. The obtained measurements then enable the determination of the coordinates of the center of gravity.

In each of the above-noted patented techniques of facilitating the determination of the center of gravity of an object, the equipment is complex and requires platform structure for mounting and manipulating the object during the process of obtaining information leading to the determination of the center of gravity of the object.

Thus, there is a need for a simple device which can facilitate the location of the center of gravity of an object in an uncomplicated fashion. There is a further need for a device with a simple mounting fixture which does not require alteration of the object and does not use any electronics, pneumatics or cumbersome measurements or mathematics.

SUMMARY OF THE INVENTION

In view of the foregoing needs, it is an object of this invention to provide a simple and inexpensive locator for facilitating the locating of the center of gravity of an object.

Another object of this invention is to provide a locator for facilitating the location of the center of gravity of an object while requiring relatively few manipulations of the object during the period when the object is being analyzed by use of the locator.

A further object of this invention is to provide a locator for facilitating the location of the center of gravity of an object by the use of a simple mounting arrangement which minimizes the handling of the object when using the locator.

With these and other objects in mind, the present invention contemplates a center of gravity locator for facilitating the location of the center of gravity of an object wherein the locator includes a support, a balancing member located on the support for movement relative thereto and a counter balancing element attached to a first portion of the balancing member. The locator further includes a holder attached to a second portion of the balancing member spaced from and generally opposite the first portion thereof and an adaptor for attachment to the object to facilitate mounting of the object on the holder in at least two prescribed orientations relative to the balancing member. In addition, the locator includes an indicator for indicating a balance through the balancing member between the counter balancing element and the holder when the object is mounted on the holder.

Other objects, features, and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 13 is a partial view of the locator of FIG. 1 showing a balanced condition with the object of FIG. 11 oriented for determination of the location of the "Y" coordinate of the center of gravity of the object in accordance with certain principles of the invention; and FIG. 14 is a partial view of the locator of FIG. 1 showing a balanced condition with the object of FIG. 11 oriented for determination of the location of the "Z" coordinate of the center of gravity of the object in accordance with certain principles of the invention.

DETAILED DESCRIPTION OF THE PREFERRED EMBODIMENT

Figure 1:
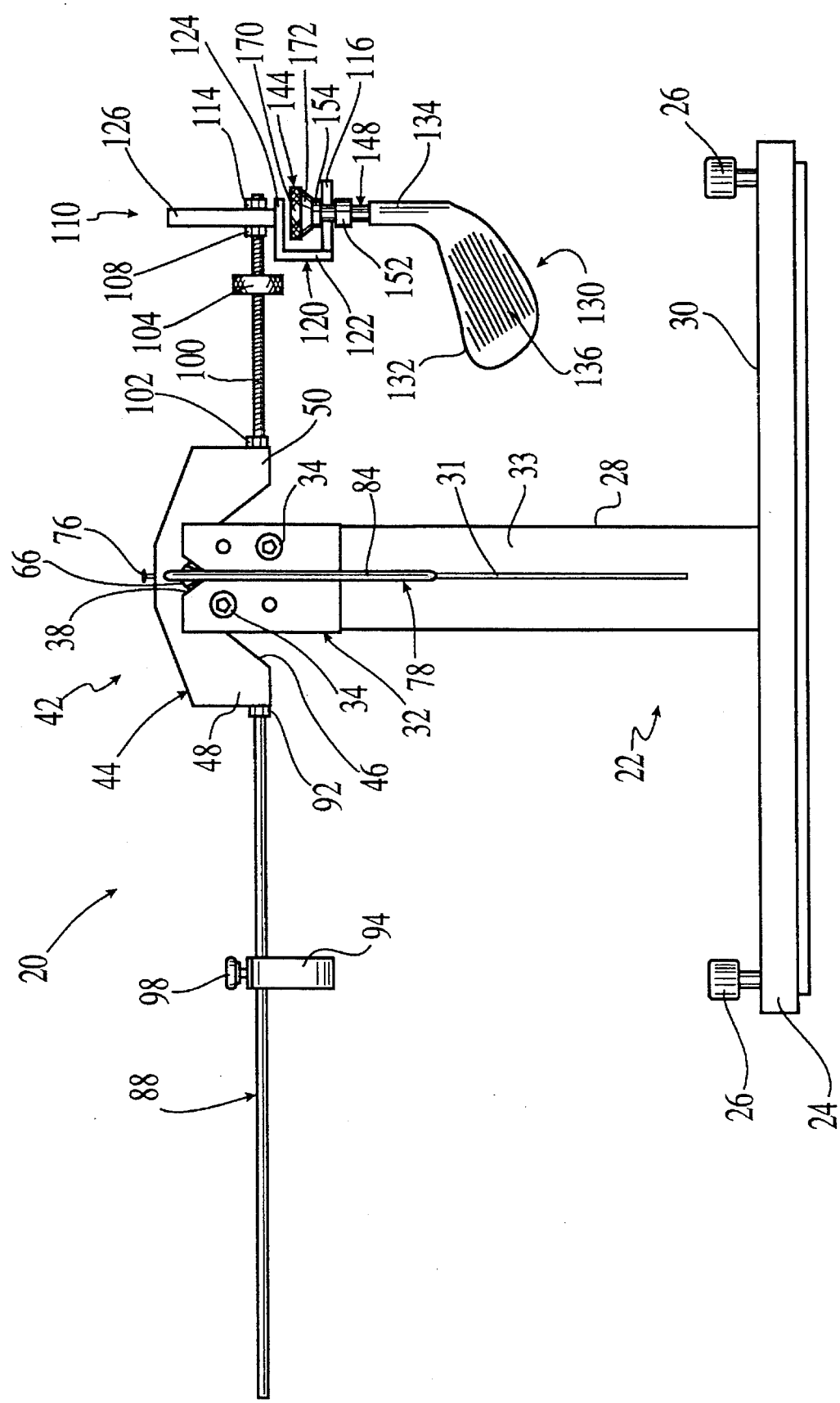
FIG. 1 is a front view of a center of gravity locator in accordance with certain principles of the invention.
Figure 2:
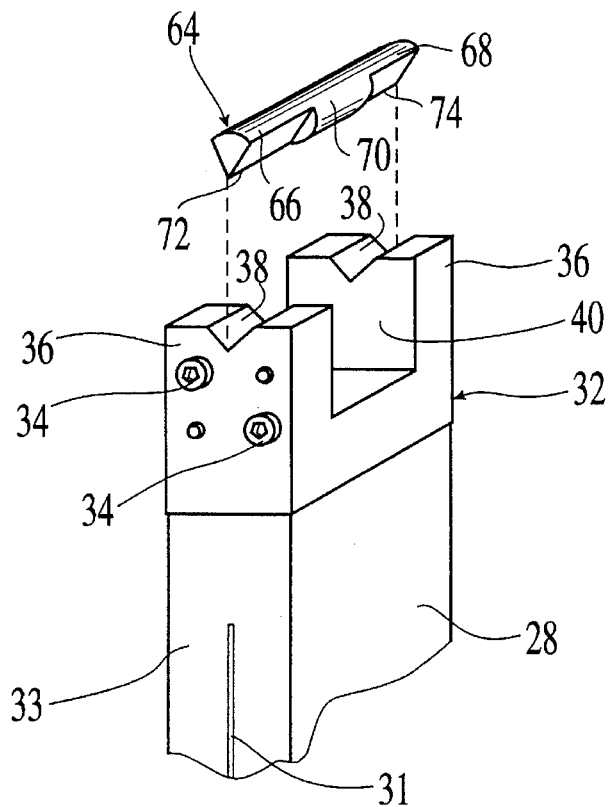
FIG. 2 is a perspective view showing components of the locator of FIG. 1 including a rocker element of a balancing member located for positioning on a support column in accordance with certain principles of the invention.

Referring to FIG. 1, a center of gravity locator 20 is provided with a support 22 which includes a platform 24 which is normally situated on a generally horizontal support surface such as a table or work bench (not shown). Platform 24 is generally of rectangular shape in the horizontal plane. Four bolts 26 (two shown) are located at four corners of platform 24 to provide for the levelling of the platform in a true horizontal plane prior to the use of locator 20. Support 22 further includes a generally vertically-oriented column 28 which is secured centrally to an upper horizontal surface 30 of platform 24 and extends vertically therefrom. A scribe line 31 is formed on a front face 33 of column 28. A balancing cap 32 is positioned on top of column 28 and is secured to the column by bolts 34. As shown in FIG. 2, cap 32 is formed with a pair of spaced stands 36 having aligned "V" shaped grooves 38 formed in the upper surfaces thereof with a space 40 located between the stands.

Figure 3:
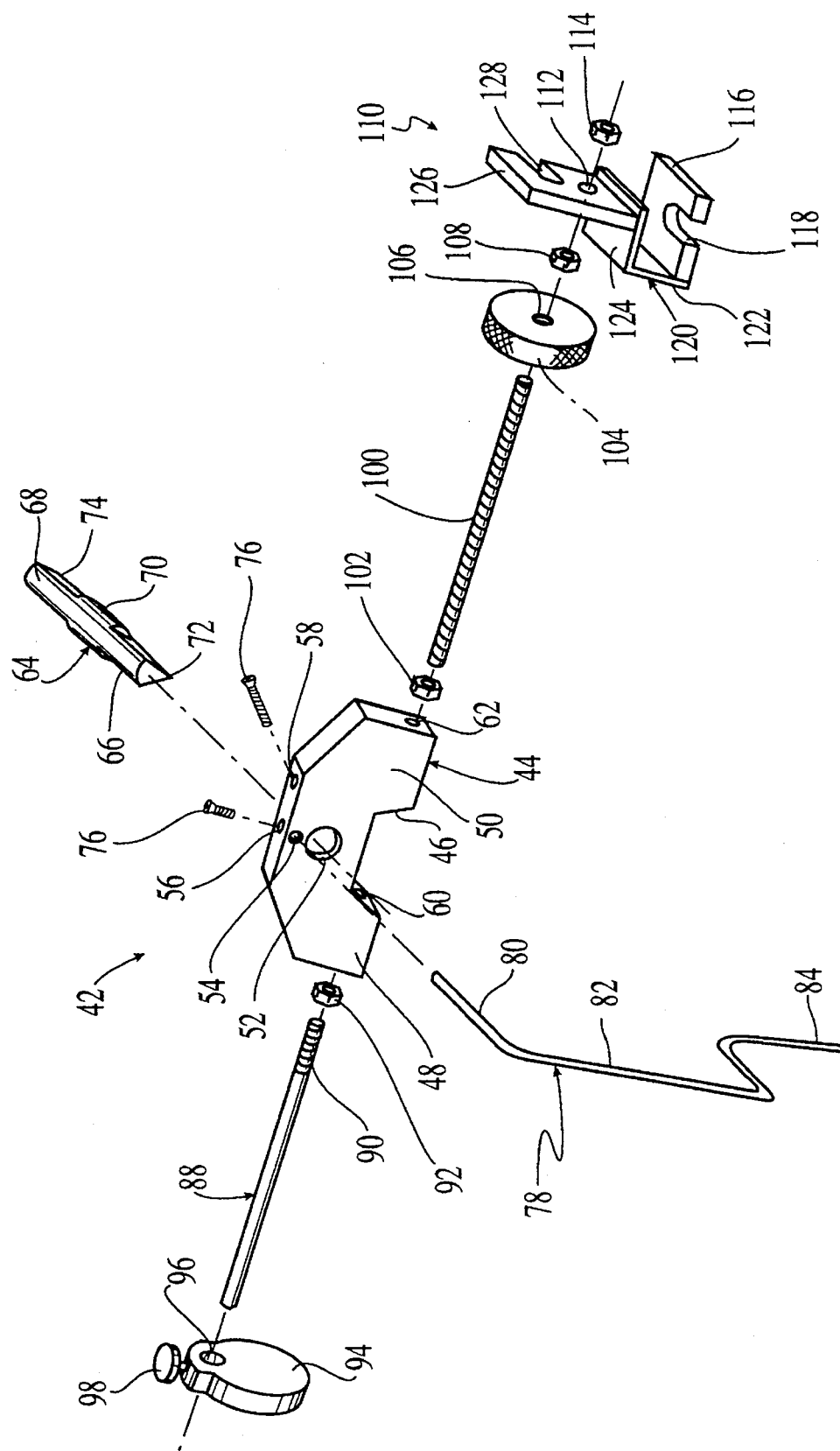
FIG. 3 is an exploded perspective view of the balancing member of the locator of FIG. 1 in accordance with certain principles of the invention.
Figure 4:
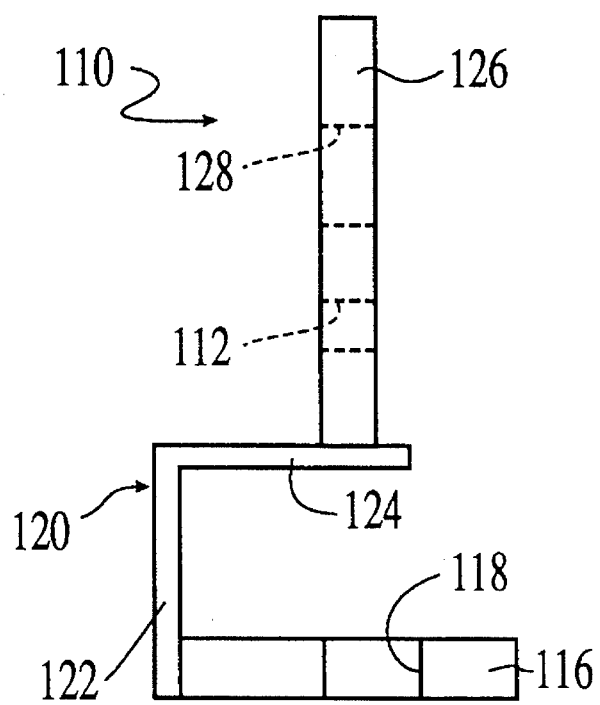
FIG. 4 is a front view of a holder of the locator of FIG. 1 for supporting an object in accordance with certain principles of the invention.
Figure 5:
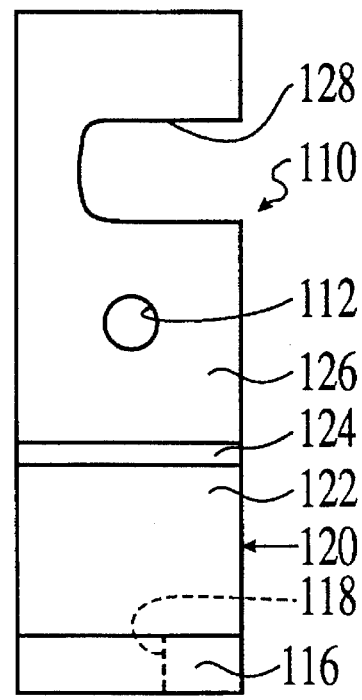
FIG. 5 is a side view of the holder of FIG. 4.
Figure 6:
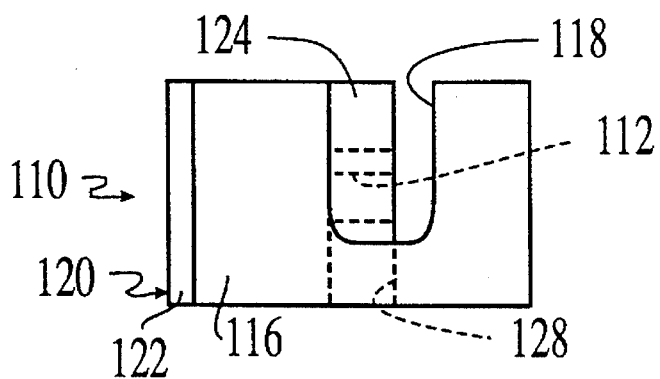
FIG. 6 is a bottom view of the holder of FIG. 4.

Referring to FIG. 3, a balancing member 42 includes a central body 44 which is formed with a wide cutout 46 centrally at the bottom thereof to define a pair of spaced body portions 48 and 50. A pair of spaced holes 52 and 54 are formed through body 44 between opposite side surfaces thereof. In addition, a first threaded hole 56 is formed through a top surface of body 44 and communicates with hole 54. A second threaded hole 58 is also formed through the top surface of body 44 and is formed at an angle so that the hole communicates with hole 52. A pair of aligned threaded holes 60 and 62 are formed through body portions 48 and 50, respectively.

As shown in FIGS. 2 and 3, a rocker element 64 is formed with opposite end portions 66 and 68 and an intermediate portion 70. Each of the end portions 66 and 68 are formed with a pie-slice cross section resulting in the formation of respective knife edges 72 and 74. Intermediate portion 70 is formed with a round cross section. Referring to FIG. 3, rocker element 64 is positioned within hole 52 of body 44 where intermediate portion 70 is located within the hole and end portions 66 and 68 extend from opposite sides of the body. Thereafter, a set screw 76 is threadedly advanced into threaded hole 58 of body 44 and is moved into engagement with intermediate portion 70 of rocker element 64 to secure the element with the body.

As shown in FIG. 3, a pointer 78 is formed from a thin rod having a mounting portion 80 a clearance portion 82 and an indicator portion 84. Pointer 78 in conjunction with scribe line 31 provides an indicator as described hereinafter. Mounting portion 80 is inserted into hole 54 of body 44 and a set screw 76 is threadedly advanced into threaded hole 56 to engage the mounting portion and secure pointer 78 with the body. A first balancing rod 88 is formed with threads 90 at one end thereof. A nut 92 is mounted on the threaded end of rod 88 and is moved over the threads 90 to expose a considerable portion of the threads between the nut and the threaded end of the rod. The threaded end of rod 88 is then threadedly advanced through an outboard end of threaded hole 60 for a prescribed distance. Nut 92 is then threadedly advanced along threads 90 toward and into engagement with body 44 to function as a lock nut and thereby assist in retaining rod 88 with the body. A counter balancing element such as a weight 94 is formed with a hole 96 and supports a set screw 98 mounted in a threaded hole (not shown) formed in the weight which communicates with hole 96. Hole 96 is positioned over a free end of rod 88 and weight 94 is movable axially along the rod and can be secured to a selected position on the rod by advancing set screw 98 into engagement with the portion of the rod located in hole 96 for purposes to be described hereinafter.

Still referring to FIG. 3, a second balancing rod 100 is threaded from one end to the other. A nut 102 is threadedly advanced onto rod 100 from the left end thereof to a position to expose a considerable portion of the threads between the nut and the left end of the rod. The exposed threads at the left end of rod 100 are advanced into the outboard end of hole 62 for a prescribed distance. Nut 102 is advanced along rod 100 toward and into engagement with body 44 to function as a lock nut and assist in securing the rod with the body. An adjustable weight 104 having a central threaded hole 106 is threadedly mounted on rod 100 from the right end of the rod as viewed in FIG. 3. Weight 104 can be adjustably located along rod 100 for purposes to be described hereinafter.

As further shown in FIG. 3, a nut 108 is advanced along rod 100 from the right end thereof. A holder 110 is formed with a mounting hole 112 which is positioned onto the right end of rod 100 and advanced axially along the rod. A nut 114 is positioned on the right end of rod 100 and advanced along the rod and into engagement with holder 110. Nut 108 is then advanced along rod 100 toward the right end thereof and into engagement with holder 110 whereby nuts 108 and 114 function as lock nuts to secure the holder in a selected position on the rod.

Referring now to FIGS. 3, 4, 5 and 6, holder 110 includes a base plate 116 having a slot 118 formed in a side face thereof. Holder 110 further includes a right-angle link 120 having a first section 122 joined along one edge thereof, and at a right angle, with an edge of a second section 124. One edge of section 122 is secured to one side of base plate 116 in such a manner that section 124 is spaced above and parallel with the base plate. Holder 110 also includes a mounting plate 126 which is secured to the top of section 124 of link 120 and is oriented to be spaced from and perpendicular with base plate 116. Mounting plate 126 is formed with a slot 128 which faces away from the open direction of slot 118 of base plate 116. In addition, mounting hole 112 of holder 110 is formed in mounting plate 126.

After the components of balancing member 42, combined with weight 94 and holder 110, have been assembled as described above, the assembled components are positioned so that knife edges 72 and 74 of rocker element 64 are located above "V" shaped grooves 38 of balancing cap 32. Balancing member 42 is then lowered so that knife edges 72 and 74 are located within grooves 38. It is noted that, as measured from the apex of each of the grooves 38, the angle between the opposite walls of each of the grooves is a prescribed size. Also, as measured from the knife edges 72 and 74, the angle between the sides of each of end portions 66 and 68 which are contiguous with knife edges 72 and 74, respectively, is less than the prescribed size of the above-noted angle associated with grooves 38. When knife edges 72 and 74 are placed in the respective grooves 38 as noted above, the knife edges are located at the apex of the respective grooves. Assuming that balancing member 42 is balanced or near balanced, the sides of each of the end portions 66 and 68 will be spaced from the adjacent side wall of the respective grooves. In this manner, rocker member 64 is now positioned to rock laterally about the apex of grooves 38 to facilitate the balancing utilization of locator 20 in the manner to be described hereinbelow.

Figure 11:
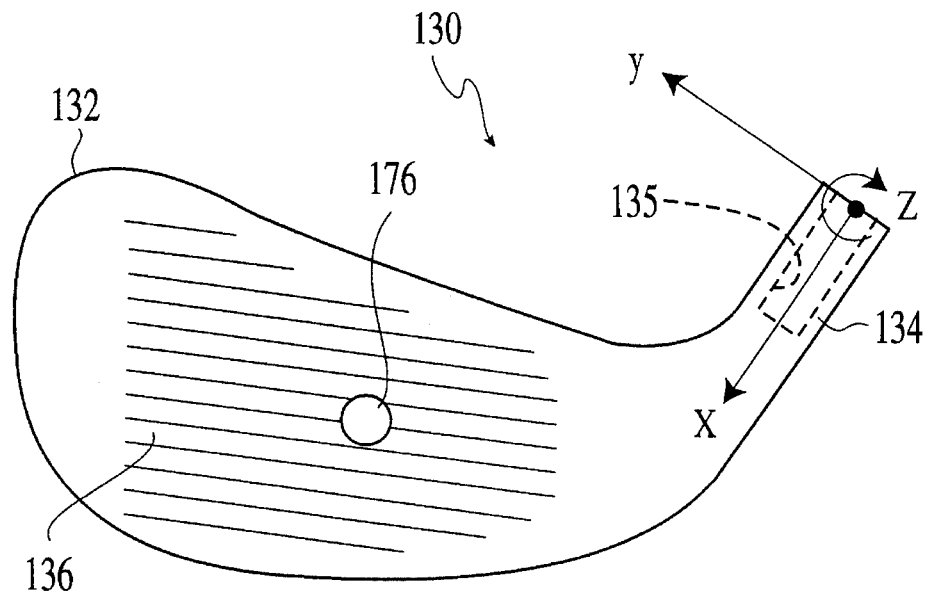
FIG. 11 is a side view of an object such as a golf club head showing X–Y–Z coordinates associated with the head.

Referring now to FIG. 11, an object, such as a golf club head 130, is formed with a body portion 132 and a hosel 134 extending from one end of the body portion. Hosel 134 is formed with an axial opening 135 having a prescribed diameter. The body portion 132 includes a strike face 136 which strikes a golf ball (not shown) when the related club (not shown) is swung by a golfer. Hosel 134 is generally cylindrical and is used to facilitate attachment and securance of a club shaft (not shown) to head 130.

Figure 7:
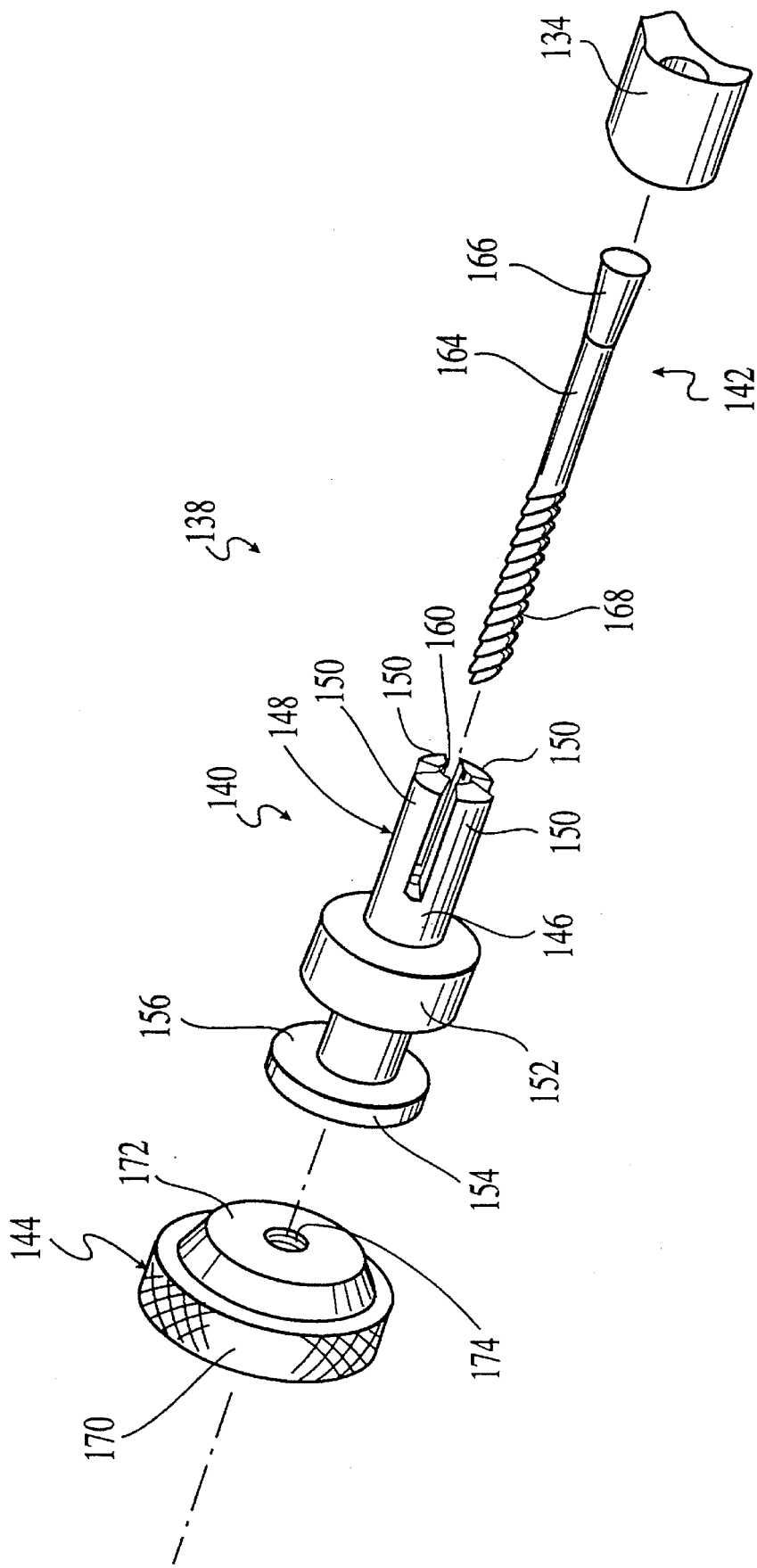
FIG. 7 is an exploded perspective view of elements of an adaptor of the locator of FIG. 1 wherein the adaptor is attachable to an object in accordance with certain principles of the invention.
Figure 8:
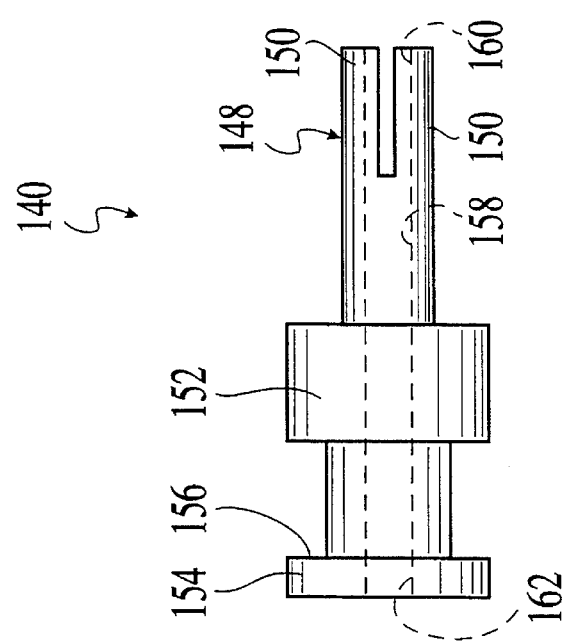
FIG. 8 is a side view of a collet member of the adaptor of FIG. 7.

As shown in FIG. 7, an adaptor 138 includes a collet member 140, a threaded spreader 142 and a threaded securing element 144. Collet member 140 is formed with a generally cylindrical-like body 146 having a collet 148 extending from one end thereof. As shown in FIGS. 7 and 8, collet 148 is formed with four axially parallel, spaced fingers 150 which extend from one end of body 146 in cantilever fashion. Fingers 150 are movable laterally inwardly or outwardly in the typical manner of a conventional collet. The external surfaces of fingers 150 combine to reveal a circular configuration having a diameter which is consistent with the diameter of body 146 slightly less than the prescribed diameter of axial opening 135 of hosel 134. Collet member 140 is formed with a first annular flange 152 along an intermediate portion of body 146 and a second annular flange 154 at an end of the body which is opposite the end from which fingers 150 extend. First and second flanges 152 and 154 are spaced apart to define a space 156 therebetween. An unthreaded passage 158 (FIG. 8) is formed axially through collet member 140 such that an axial entry opening 160 is formed adjacent fingers 150 and an exit opening 162 (FIG. 8) is formed axially at the opposite end which includes second flange 152.

Figure 9:
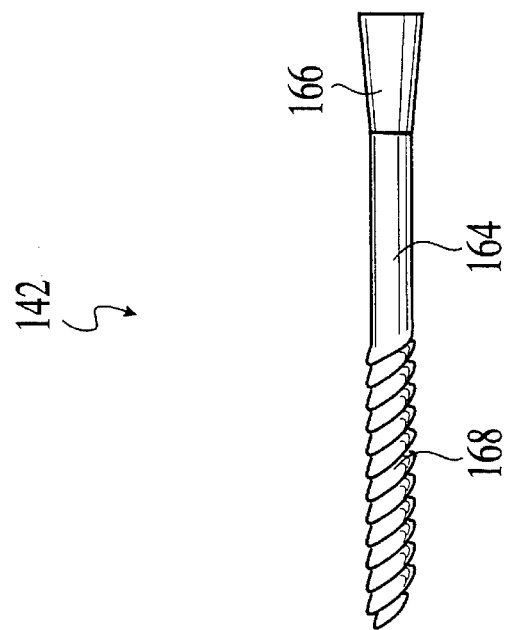
FIG. 9 is a side view of an expander of the adaptor FIG. 7.

Referring now to FIGS. 7 and 9, threaded spreader 142 is formed with a central cylindrical-like body 164. A tapered head 166 is integrally and axially formed with body 164 at one end of the body. The taper of head 166 extends axially inwardly from the outboard end of spreader 142 toward the opposite end of the spreader. Spreader 142 is formed with a threaded portion 168 from an intermediate portion from central body 164 to an end of the spreader opposite the end containing head 166.

Figure 10:
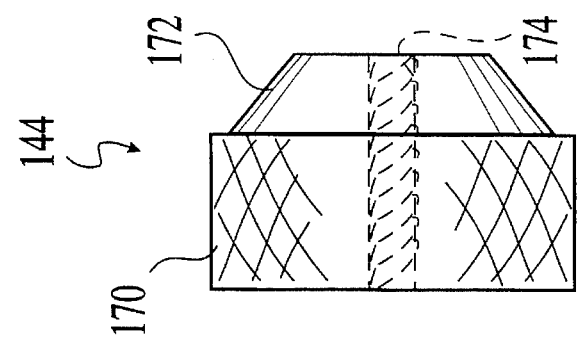
FIG. 10 is a side view of a fastener member of the adaptor of FIG. 7.

As shown in FIGS. 7 and 10, securing element 144 is formed with a cylindrical body 170 and a tapered extension 172. Element 144 is further formed with a threaded hole 174 axially therethrough. Cylindrical body 170 is formed with a knurled peripheral surface.

When assembling the components of adaptor 138, the threaded portion 168 and central body 164 of spreader 142 are moved into unthreaded passage 158 through entry opening 160. Eventually, the outboard end of threaded portion 168 protrudes from exit end 162 of collet member 140 and the inboard end of tapered head 166 is located adjacent entry opening 160 of passage 158. Securing element 144 is threaded onto the end portion of threaded portion 168 of spreader 142 which protrudes from exit opening 162 of collet member 140 with tapered extension 172 facing flange 154.

As noted above, the diameter of the combined external surfaces of fingers 150 is slightly less than the prescribed diameter of axial opening 135 of club head hosel 134. Fingers 150, with tapered head 166 protruding from the ends thereof, are inserted into hosel opening 135 until the free ends of the fingers are near or at the bottom of the hosel opening. Thereafter, securing element 144 is rotated relative to collet member 140 whereby spreader 142 is threadedly pulled axially further through passage 158 of the collet member. As spreader 142 is moved through passage 158, tapered head 166 moves gradually into entry opening 160 of passage 158 to initiate the spreading apart of fingers 150. As fingers 150 are spread, the external surfaces are pressed into engagement with the inner wall of hosel opening 135. Eventually, fingers 150 are pressed sufficiently into the walls of hosel opening 135 whereby adaptor 138 is frictionally held with club head 130.

It is desirable, from time to time, to determine the location of the center of gravity of an object such as, for example, club head 130. The center of gravity is located internally of club head 130 in line with a representative symbol 176 which appears in FIGS. 11 through 14. While the center of gravity of club head 130 is located within the club head, such center is not determinable by making external measurements on the club head. However, the center of gravity of club head 130 can be determined by use of locator 20 in the manner described hereinbelow with reference to a X–Y–Z coordinate system associated with the club head.

Referring again to FIG. 11, the origin of the X–Y–Z coordinate system for club head 130 is located at the center of the top of hosel 134. The "X" axis extends axially down hosel 134 and the "Y" axis is perpendicular to the axis of the hosel and parallel to the club face. Club head 130 is depicted as a wood club head. For club heads of irons (not shown), the "Y" axis is parallel to the bottom edge of the club head. By the right hand rule, the "Z" axis is orthogonal to the "X" and "Y" axes and is directed behind strike face 136.

When preparing to use locator 20 (FIG. 1), the locator includes the components as illustrated in FIG. 1 except that adaptor 138 and club head 130 are not yet assembled with the locator. Platform 24 is placed on a generally level, horizontal surface (not shown) and bolts 26 are adjusted to insure that the platform is truly level by use of, for example, a conventional bubble level. Weight 94 is then placed on rod 88 in a random location on the rod and is secured at the randomly selected location by adjustment of set screw 98. Typically, this creates an imbalance through balancing member 42 whereby pointer 78 is positioned out of alignment with scribe line 31. Weight 104 is then adjusted threadedly on threaded rod 100 until balancing member 42 is balanced whereby pointer 78 is aligned with scribe line 31. Locator 20 is now zero-adjusted and is prepared for assisting in the determination of the location of the center of gravity of club head 130.

Figure 12:
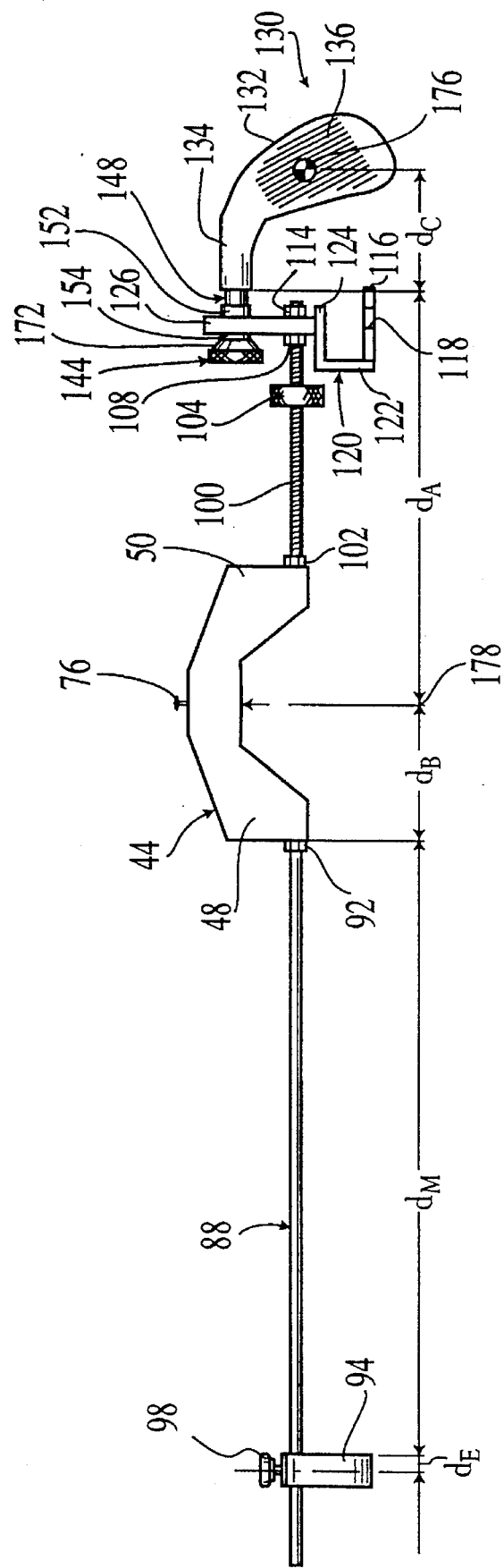
FIG. 12 is a partial view of the locator of FIG. 1 showing a balanced condition with the object of FIG. 11 oriented for determination of the location of the "X" coordinate of the center of gravity of the object in accordance with certain principles of the invention.

It is to be understood that the illustrations of FIGS. 12, 13 and 14 are representative of locator 20 even though some components are not shown. The illustrations of FIGS. 12, 13 and 14 have been simplified to enhance the following detailed explanation of the use of locator 20.

Following zero-adjustment of locator 20 as described above, adaptor 138 is assembled with club head 130 as described above. Space 156 (FIG. 7) of collet member 140 is positioned in slot 128 (FIG. 5) of holder 110 whereby club head 130 assumes the position shown in FIGS. 1 and 12. As shown in FIG. 12, club head 130 is now positioned for obtaining data by use of locator 20 which assists in the determination of the coordinate of the "X" axis of the center of gravity of the club head.

As shown in FIGS. 12, 13 and 14 a pivot point 178 represents the point of balance of balancing member 42 when pointer 78 is aligned with scribe line 31 in the manner illustrated in FIG. 1. Locator 20 operates on a simple physics principle related to analytical balance where moments about pivot point 178 are summed to determine the unknown location of the center of gravity of an object such as club head 130. Various distances are represented in FIGS. 12, 13 and 14 which use pivot point 178 as a reference point. The distances, which are measured in inches, are represented as follows:

$d_A$=distance between pivot point 178 and the top of hosel 134;

$d_B$=distance between pivot point 178 and the outboard side of body portion 48;

$d_C$=distance between the top of hosel 134 and the center of gravity of club head 130;

$d_E$=distance from the inboard side of weight 94 to the centerline thereof as viewed in FIG. 12; and $d_M$=distance from the outboard side of body portion 48 and the inboard side of weight 94.

In addition, the mass (in grams) of weight 94 is represented hereinbelow as "$m_W$" and the mass (in grams) of club head 130 is represented hereinbelow as "$m_C$."

Locator 20 operates on a simple physics principle of analytical balance. By summing moments about pivot point 178, the unknown location ("$d_C$") of the center of gravity of club head 130 can be determined by solving the following equation for "$d_C$".

$$\Sigma M_O = 0 \quad (1)$$

$$m_w(d_E + d_M + d_B) = m_c(d_A + d_C) \quad (2)$$

$$d_C = \frac{m_w(d_E + d_M + d_B)}{m_c} - d_A \quad (3)$$

Referring again to FIG. 12, when determining the "X" coordinate of the center of gravity of club head 130, space 156 (FIG. 7) of collet member 140 is positioned in a slot 128 (FIG. 5) of holder 110 as noted above which creates an imbalance in balancing member 42. In this manner, club head 130 is held in assembly with balancing member 42. Weight 94 is then moved along rod 88 until pointer 78 is again aligned with scribe line 31 which indicates a balanced condition. Weight 94 is secured there by use of set screw 98. A measuring implement such as, for example, a caliper (not shown) is used to determine the various distances illustrated in FIG. 12 except for distance "$d_C$" which is the unknown. By applying the measured distances and the known mass of weight 94 and club head 130 to equation (3) above, the unknown distance "$d_C$" can be determined. This provides the location of the "X" coordinate of the center of gravity of club head 130 relative to the outboard end of hosel 134.

It is noted that, with respect to the "Y" and "Z" coordinates of the center of gravity of club head 130, and with reference to FIGS. 13 and 14, distance "$d_A$" is measured from pivot point 178 to the centerline of hosel 134. Further, with respect to the "Y" and "Z" coordinates, the unknown distance "$d_C$" is measured from the hosel centerline to the center of gravity in a direction toward pivot point 178 Consequently, the equation for determining "$d_C$" for the "Y" and "Z" coordinates is derived as follows:

$$m_w(d_E + d_M + d_B) = m_c(d_A - d_C) \quad (4)$$

$$d_C = d_A - \frac{m_w(d_E + d_M + d_B)}{m_c} \quad (5)$$

Following completion of the determination of "$d_C$" for the "X" coordinate, adaptor 138 is removed from assembly with holder 110 and locator 20 is zero-adjusted again in the same manner as described above. Referring to FIG. 13, in preparation for the determination of distance "$d_C$" with respect to the "Y" coordinate, adaptor 138 with club head 130 assembled therewith is positioned so that space 156 of the adaptor is located in slot 118 of holder 110 with the club head directed inwardly and strike face 136 facing forwardly as shown. This creates an imbalance in balancing member 42 whereafter weight 94 is adjusted to balance the member in the manner described above. Set screw 98 is then adjusted to secure weight 94 in place.

The measuring implement is then used to determine the various distances which, together with the known mass of weight 94 and club head 130, are applied to equation (5) to solve for the unknown distance "$d_C$" and thereby provide indication of the location of the "Y" coordinate of the center of gravity of the club head.

Referring to FIG. 14, when preparing for the determination of "$d_C$" with respect to the "Z" coordinate of the center of gravity of club head 130, space 156 of adaptor 138 remains in slot 118 of holder 110. Club head 130 is then rotated ninety degrees so that strike face 136 is facing to the right as shown in FIG. 14. Since adaptor 138 was not removed from assembly with holder 110, balancing member 42 does not require a zero adjustment when processing locator 20 for determination of the distance "$d_C$" with respect to the "Z" coordinate.

As a result of rotating club head 130 through ninety degrees as noted above, balancing member 42 becomes unbalanced. Weight 94 is adjusted along rod 88 until pointer 78 is again aligned with scribe line 31 to indicate a balanced condition. The measuring implement is then used to determine the various distances except for the unknown distance "$d_C$". The measured distances, and the mass of weight 94 and club head 130, are applied to equation (5) which is thereafter solved to determine distance "$d_C$" and thereby the location of the "Z" coordinate of the center of gravity of the club head.

In the foregoing manner, the "X" "Y" and "Z" coordinates are determined and can now be used in the calculation of other parameters such as, for example, the moment of inertia of club head 130. In this manner, locator 20 facilitates the determination of the unknown location of the center of gravity of an object such as club head 130 to provide readily available data for further determination of other parameters associated with the object.

In general, the above-identified embodiments are not to be construed as limiting the breadth of the present invention. Modifications, and other alternative constructions, will be apparent which are within the spirit and scope of the invention as defined in the appended claims.

What is claimed is:

1. A locator for facilitating the location of the center of gravity of an object, which comprises:

a support;

a balancing member located on the support for movement relative thereto;

a counter balancing element attached to a first portion of the balancing member;

a holder attached to a second portion of the balancing member spaced from and generally opposite the first portion thereof; and an adaptor for attachment to the object to facilitate mounting of the object on the holder in at least three prescribed orientations relative to the balancing member.

2. The locator as set forth in claim 1, which further comprises an indicator for indicating a balance through the balancing member between the counter balancing element and the holder when the object is mounted on the holder.

3. The locator as set forth in claim 1 wherein the support comprises:

a platform;

adjustment structure for locating the platform in a prescribed orientation; and a column secured to the platform.

4. The locator as set forth in claim 1 wherein the balancing member comprises:

a body portion;

a first rod mounted on and extending from a first side of the body portion;

a second rod mounted on and extending from a second side of the body portion opposite the first side;

the counter balancing element mounted on the first rod; and an adjustable weight mounted on the second rod.

5. The locator as set forth in claim 4 wherein the balancing member further comprises:

a rocker element secured to the body portion and mounted on the support for balancing movement thereon.

6. The locator as set forth in claim 1, which comprises:

a frame formed with a first slot for supporting the adaptor in at least a first position; and the frame formed with a second slot for supporting the adaptor in at least a second position.

7. The locator as set forth in claim 1, wherein the adaptor comprises:

structure for mounting the adaptor to the object; and structure for mounting the adaptor to the holder.

8. The locator as set forth in claim 2, wherein the indicator comprises:

a pointer attached to the balancing member for movement therewith; and a scribe line formed on the support with which the pointer aligns when the balancing member is balanced.

9. The locator as set forth in claim 1, wherein the support includes a cap having a groove formed in one surface thereof and the balancing member includes a rocker element situated in the groove for movement therein during periods when the member is unbalanced and for being balanced therein when the balancing member is balanced.

10. The locator as set forth in claim 1, wherein the balancing member comprises:

a body portion;

a first rod mounted on and extending from a first portion of the body portion;

the counter balancing element being mounted for sliding movement on the first rod;

a device for securing the counter balancing element to any selected position on the first rod;

a second rod mounted on and extending from a second portion of the body portion; and a weight mounted on the second rod for adjustable movement thereon.

11. The locator as set forth in claim 1, wherein the balancing member comprises:

a body portion;

a balancing element mounted on the body portion;

the balancing element formed with a pair of spaced, axially aligned end sections extending from opposite sides of the body portion; and each of the end sections formed with a pie-slice cross section and having a knife-like edge in alignment with the knife-like edge of the other end section.

12. The locator as set forth in claim 11, which further comprises:

a cap located on the support;

the cap formed with a pair of spaced stands;

each of the stands being formed with a groove in alignment with the groove of the other stand; and each of the knife-like edges being located for balancing movement in a respective one of the grooves.

13. The locator as set forth in claim 12, which further comprises:

each of the grooves formed in the stands having opposed walls which are joined along a common edge forming an apex of the groove so that the groove is formed in a "V" shaped configuration.

14. The locator as set forth in claim 13, which further comprises:

the walls of each of the grooves being spaced sufficiently to receive a respective one of the end sections within the groove with the knife-like edge thereof located in the apex of the groove and with the end section being smaller than the groove to allow movement by the end section between the walls of the respective groove.

15. The locator as set forth in claim 1, wherein the adaptor comprises:

a collet member; and a spreader.

16. The locator as set forth in claim 15, wherein the collet member comprises:

a pair of spaced annular flanges;

a collet having a plurality of fingers extending in an axial direction from one end thereof; and an axial opening extending therethrough.

17. The locator as set forth in claim 16, wherein the spreader comprises:

an inwardly tapered portion formed on and tapering inwardly from one end thereof; and a shank portion in axial alignment and joined with the tapered portion for insertion through the axial opening of the collet member whereby the tapered portion engages and spreads the collet fingers.

18. The locator as set forth in claim 17, which further comprises:

the shank portion of the spreader being threaded; and a securing element having a threaded through hole and positionable on a threaded end of the shank portion extending from the axial opening of the collet to draw the tapered portion of the spreader into the collet to spread the fingers.

19. The locator as set forth in claim 1, wherein the object is a golf club head.

20. A locator for facilitating the location of the center of gravity of an object, which comprises:

a support having a pair of spaced, aligned "V" shaped grooves;

a balancing member;

a rocker element attached to and extending from opposite sides of the balancing member;

the rocker element having "V" shaped sections on opposite ends thereof which are smaller than, and rest in, the "V" shaped grooves of the support;

a counter balancing element attached adjustably to a first end of the balancing member;

an adaptor for attachment to the object to facilitate mounting the object in a prescribed orientation to a second end of the balancing member opposite the first end thereof; and an indicator for indicating a balanced condition through the balancing member between the counter balancing element and the object.

* * * * *